United States Patent [19]

Howie, Jr.

[11] 4,441,230
[45] Apr. 10, 1984

[54] MOLDED KNOB WITH RESILIENT FRICTION FIT FINGER

[75] Inventor: Robert K. Howie, Jr., Decatur, Ill.

[73] Assignee: The Grigoleit Company, Decatur, Ill.

[21] Appl. No.: 346,178

[22] Filed: Feb. 5, 1982

[51] Int. Cl.³ .............................................. F16D 1/06
[52] U.S. Cl. ................................. 16/121; 16/DIG. 30; 411/373
[58] Field of Search .................. 16/117, 118, 121, 123, 16/DIG. 30, DIG. 40; 403/361, 383; 292/349, 353; 74/553; 411/371, 372, 373, 374, 377

[56] References Cited

U.S. PATENT DOCUMENTS

| Re. 18,815 | 5/1933 | De Tar. | |
|---|---|---|---|
| 1,938,556 | 12/1933 | Danielson | 287/53 |
| 1,951,188 | 3/1934 | Flaherty | 287/53 |
| 2,189,845 | 2/1940 | Terrill | 287/53 |
| 2,197,140 | 4/1940 | Arvin | 64/1 |
| 2,283,905 | 5/1942 | Beal | 287/53 |
| 2,291,560 | 7/1942 | Rhodes | 287/53 |
| 3,188,124 | 6/1965 | Pestka et al. | 287/53 |
| 3,193,312 | 7/1965 | Ehner | 287/53 |
| 3,336,059 | 8/1967 | Leitmann | 287/53 |
| 3,429,199 | 2/1969 | Kenyon | 74/548 |
| 3,679,252 | 7/1972 | Howie, Jr. | 292/349 |
| 3,880,534 | 4/1975 | Schmidt | 403/230 |
| 3,880,536 | 4/1975 | Petrus | 403/361 |
| 3,965,529 | 6/1976 | Hadzimahalis | 16/121 |
| 3,994,608 | 11/1976 | Swiderski et al. | 403/372 |
| 4,179,771 | 12/1979 | Rankins et al. | 16/121 |
| 4,295,246 | 10/1981 | Howie, Jr. | 16/121 |

FOREIGN PATENT DOCUMENTS

| 1045845 | 12/1958 | Fed. Rep. of Germany. | |
|---|---|---|---|
| 2103402 | 8/1972 | Fed. Rep. of Germany | 16/118 |

Primary Examiner—Fred A. Silverberg
Attorney, Agent, or Firm—Kinzer, Plyer, Dorn & McEachran

[57] ABSTRACT

A molded knob of the type which frictionally engages and slips over the end of a shaft of generally circular cross section and having at least one longitudinally extending flat surface. A hub is formed as part of the knob. A shaft receiving walled socket is formed in the hub. The socket has a flat wall adapted to engage the shaft. Side walls extending from the flat wall are positioned to contact the curved wall of the shaft. Abutments are located at the ends of the side walls distal from the flat wall and are positioned to engage the shaft. A resilient finger is located in the socket opposite the flat wall between the abutments and positioned to engage and apply pressure to the curved outer surface of the shaft. The abutments are dimensioned to engage the shaft to limit deflection of the resilient finger beyond that necessary to apply a force to the shaft.

1 Claim, 4 Drawing Figures

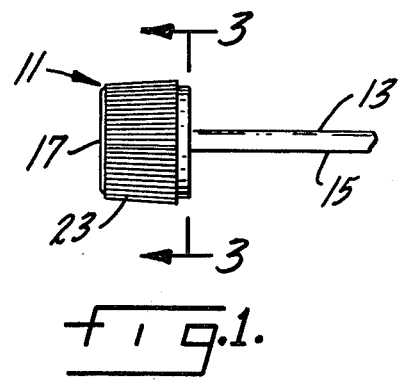
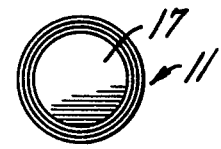
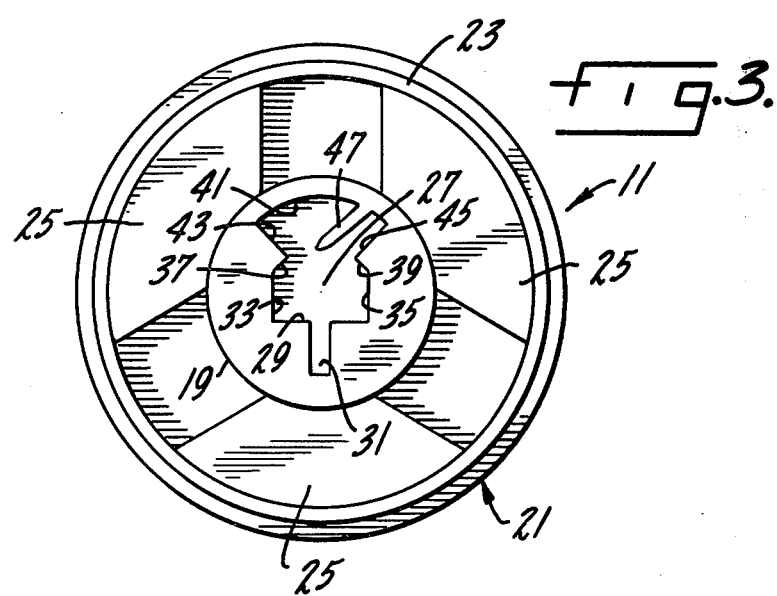
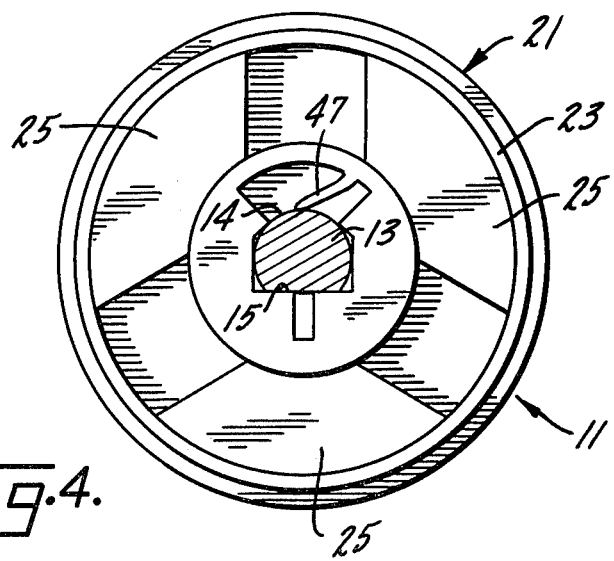

MOLDED KNOB WITH RESILIENT FRICTION FIT FINGER

BACKGROUND AND SUMMARY OF THE INVENTION

The molded plastic knob of this invention is of the general type of friction fit knob shown and described in U.S. Pat. No. 3,679,252 of Robert K. Howie, Jr.; U.S. Pat. No. 4,179,771 of Paul Rankins and Robert K. Howie, Jr. and U.S. Pat. No. 4,295,246 of Robert K. Howie, Jr., all of which are assigned to the assignee of this application.

This invention is directed to a friction fit molded plastic knob having a hub of relatively small diameter compared to the cross sectional size of the shaft on which the knob is mounted.

An object of this invention is a friction fit knob which can be manufactured in relatively small sizes.

Another object of this invention is a friction fit knob having stop means to prevent overstressing of the resilient force applying member.

Other objects may be found in the following specification, claims and drawings.

BRIEF DESCRIPTION OF THE DRAWINGS

The invention is illustrated more or less diagrammatically in the following drawings wherein:

FIG. 1 is a side elevational view of the knob of this invention mounted on a shaft;

FIG. 2 is a front end view of the knob of this invention;

FIG. 3 is an enlarged rear view of the knob taken along line 3—3 of FIG. 1; and

FIG. 4 is a rear view of a knob of this invention on an enlarged scale with a shaft inserted in the socket and shown in cross section.

DESCRIPTION OF THE PREFERRED EMBODIMENT

FIGS. 1 and 4 of the drawings show a molded knob 11 embodying the novel features of this invention mounted on a solid shaft 13. The shaft is customarily made of metal and may be constructed having a generally cylindrical outer surface 14 with one flat side 15. The solid shaft is only one example of the many types of shafts which can be used with the molded knob of this invention. It should be understood that such a shaft may be formed as an integral part of the device it operates such as a switch or valve or the like.

The knob 11 of this invention may be molded from a thermoplastic material such as nylon or other suitable plastic material. The knob shown in this drawing is cylindrical in shape and has a decorative metal end cap 17. A knob of this type is used on a radio or other piece of electronic equipment. However, the invention is adaptable to other types of knobs such as those used on household appliances, etc.

A knob, whatever its purpose or shape, includes a hub 19. In this embodiment, the hub is formed as the interior core of a larger cylinder 21. The outer wall 23 of the cylinder is molded integrally with the hub and jointed thereto by longitudinally extending webs 25. The surface of the outer wall 23 may be knurled for gripping purposes.

The hub 19, which is generally cylindrical in shape, has a shaft receiving socket 27 formed therein. The socket, which is of irregular transverse cross section, has a flat longitudinally extending wall 29 on one side thereof. A coring slot 31 intersects this wall and opens into the socket. The socket also includes side walls 33 and 35 which extend from the flat wall 29. The side walls are inclined towards each other slightly relative to the flat wall 29. Each side wall terminates at its distal end in an abutment surface 37 and 39, respectively. The abutment surfaces extend at angles of approximately 45° relative to the flat wall 29. The socket 27 is completed by a curved wall 41 joined to the abutment surfaces 37 and 39 by radially extending walls 43 and 45.

A resilient finger 47 extends into the socket from the curved wall 41 terminating between the abutment surfaces 37 and 39 where it can engage the curved portion 14 of the shaft 13 when the shaft is inserted into the socket 27. The resilient finger extends obliquely relative to the shaft so that the engagement of the shaft with the resilient finger will cause a bending of the finger and the application of force to the shaft. The abutment surfaces 37 and 39 function to engage the shaft to prevent overstressing of the resilient finger especially when turning torque is applied to the shaft.

I claim:

1. A molded knob of the type which frictionally engages and slips over the end of a shaft of generally circular cross section with a curved outer surface and having at least one longitudinally extending flat surface, a hub formed as part of the knob, a shaft receiving walled socket formed in the hub, said socket having a flat wall adapted to engage the shaft, said walls extending from the flat wall and positioned to contact the curved surface of the shaft, abutments located at the ends of the side walls distal from the flat wall and positioned to engage the shaft, and a curved wall located opposite to the flat wall, and a resilient finger extending from the curved wall and having a tip with only the tip positioned to engage and apply pressure to the curved surface of the shaft, the resilient finger being located out of contact with the abutments, said resilient finger extends obliquely to the flat wall of the socket, said abutments dimensioned to engage the shaft to limit deflection of the resilient finger beyond that necessary to apply a force to the shaft.

* * * * *